United States Patent
Kato

(10) Patent No.: US 10,232,809 B1
(45) Date of Patent: Mar. 19, 2019

(54) VEHICLE CIRCUIT BODY

(71) Applicant: Yazaki Corporation, Tokyo (JP)

(72) Inventor: Shingo Kato, Susono (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/106,799

(22) Filed: Aug. 21, 2018

(30) Foreign Application Priority Data

Aug. 29, 2017 (JP) ................................. 2017-164508

(51) Int. Cl.
*B60R 16/02* (2006.01)
*H01B 7/08* (2006.01)
*H01B 7/04* (2006.01)

(52) U.S. Cl.
CPC ........... *B60R 16/0215* (2013.01); *H01B 7/08* (2013.01); *H01B 7/04* (2013.01)

(58) Field of Classification Search
CPC .............................. B60R 16/0215; H01B 7/08
USPC ....................................................... 174/72 A
See application file for complete search history.

(56) References Cited

U.S. PATENT DOCUMENTS 7,729,570 B2 * 6/2010 Yamada ............. G02B 6/12002
385/14

2005/0011687 A1 * 1/2005 Yamaguchi ............... B60K 6/48
180/65.1
2012/0024598 A1 * 2/2012 Awakawa ........... B60R 16/0215
174/70 R
2012/0312595 A1 * 12/2012 Sawada ............... B60R 16/0215
174/72 A

FOREIGN PATENT DOCUMENTS

| JP | 2005-78962 A | 3/2005 |
|---|---|---|
| WO | 2017/222058 A1 | 12/2017 |
| WO | 2017/222059 A1 | 12/2017 |
| WO | 2017/222060 A1 | 12/2017 |
| WO | 2017/222066 A1 | 12/2017 |
| WO | 2017/222067 A1 | 12/2017 |
| WO | 2017/222068 A1 | 12/2017 |
| WO | 2017/222069 A1 | 12/2017 |
| WO | 2017/222071 A1 | 12/2017 |
| WO | 2017/222073 A1 | 12/2017 |
| WO | 2017/222074 A1 | 12/2017 |
| WO | 2017/222075 A1 | 12/2017 |
| WO | 2017/222076 A1 | 12/2017 |
| WO | 2017/222077 A1 | 12/2017 |

* cited by examiner

*Primary Examiner* — Timothy J Thompson
*Assistant Examiner* — Charles Pizzuto
(74) *Attorney, Agent, or Firm* — Sughrue Mion, PLLC

(57) ABSTRACT

A vehicle circuit body includes: a first wiring member including a first power supply line and a first ground line which have high rigidity; and a second wiring member including a second power supply line and a second ground line which have low rigidity. The first wiring member is located at a flat portion of a body panel, and the second wiring member is located at a protruding portion of the body panel protruding toward a cabin side. The second power supply line and the second ground line of the second wiring member have flexibility so as to be deformed along a shape of the protruding portion.

4 Claims, 5 Drawing Sheets

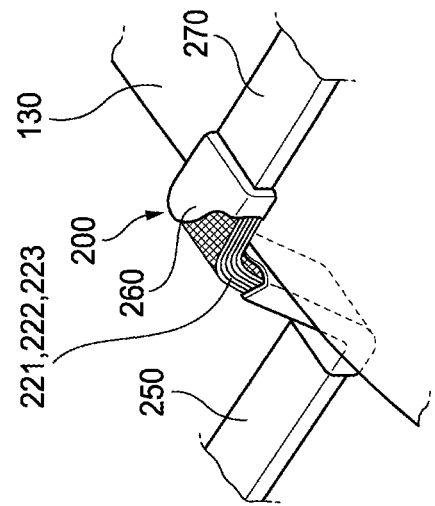
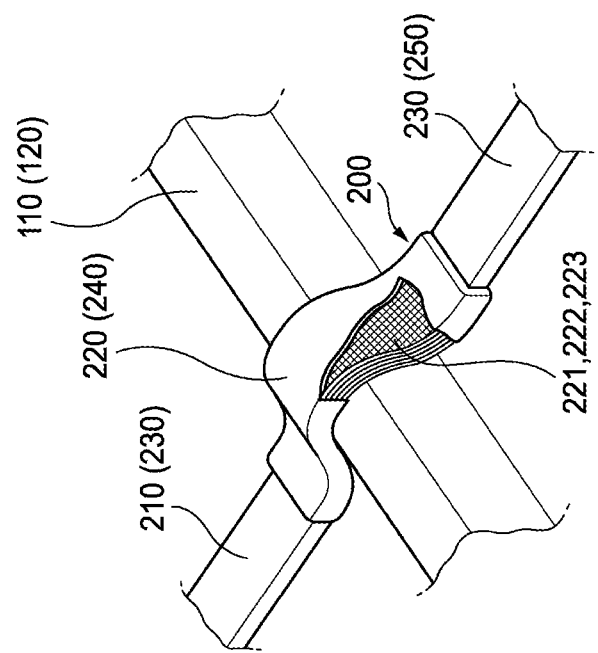

VEHICLE CIRCUIT BODY

CROSS-REFERENCES TO RELATED APPLICATIONS

This application is based on and claims priority from Japanese Patent Application No. 2017-164508 filed on Aug. 29, 2017, the entire contents of which are incorporated herein by reference.

FIELD

One or more embodiments of the present invention relate to a vehicle circuit body.

BACKGROUND

In recent years, an in-vehicle network system becomes diversified and it becomes difficult to maintain a simplified wire harness form. In such a situation, JP-A-2005-78962 discloses a wire harness capable of responding even when a device configuration on a network becomes diversified.

SUMMARY

When a vehicle wiring member such as a battery cable is wired in a cabin, wiring along a concavo-convex shape of a body panel is required along with the needs of an expanded living space in the cabin. In order to wire the vehicle wiring member along the body panel, it is necessary to bend the vehicle wiring member according to the shape of the body panel.

However, it is difficult to bend heavy electric wires according to the shape of the body panel, and thus wiring along the concavo-convex shape of the body panel is difficult. Particularly, in a case where electric wires constituting the vehicle wiring member are flat rigid bodies, the vehicle wiring member can be wired according to the shape of the body panel by bending a predetermined portion before wiring. However, it is necessary to prepare vehicle wiring members of different shapes depending on the body panel, and thus it is not practical.

Further, when the predetermined portions of the electric wire constituted of a flat rigid body is bent, the vehicle wiring body does not have a linear shape and has a three-dimensional shape bent at plural portions, and thus the size thereof is likely to be increased. Such a vehicle wiring member having a large size is difficult to be wired on the body panel, and further it becomes difficult to be packed and transported.

One or more embodiments of the invention have been made in view of the circumstances described above and an object thereof is to provide a vehicle circuit body which can be wired along a concavo-convex shape of a body panel and can realize miniaturization.

One or more embodiments of the invention provide a vehicle circuit body of the following items (1)-(4).

(1) A vehicle circuit body including: a first wiring member including a first power supply line and a first ground line which have high rigidity; and a second wiring member including a second power supply line and a second ground line which have low rigidity, wherein the first wiring member is located at a flat portion of a body panel, and the second wiring member is located at a protruding portion of the body panel protruding toward a cabin side, and wherein the second power supply line and the second ground line of the second wiring member have flexibility so as to be deformed along a shape of the protruding portion.

(2) The vehicle circuit body according to (1) described above, wherein the second power supply line and the second ground line of the second wiring member are formed of flat braid conductors.

(3) The vehicle circuit body according to (2) described above, wherein the first power supply line and the first ground line of the first wiring member are formed of flat conductors, and the first power supply line and the first ground line are laminated, and wherein the second power supply line and the second ground line of the second wiring member are laminated.

(4) A vehicle circuit body including: a plurality of band-plate-shaped conductors are laminated in a thickness direction, wherein the conductors are formed of flat braided conductors of which parts in a longitudinal direction are flat-braided in a band-plate shape, and wherein the parts of the plural conductors are laminated in the thickness direction.

According to the vehicle circuit body of the configuration of (1) described above, the position where the second wiring member having high flexibility is provided is located according to the position of the protruding portion when the vehicle circuit body is wired on the body panel, and thus the vehicle circuit body can be wired according to the concavo-convex shape of the body panel.

According to the vehicle circuit body of the configuration of (2) described above, it is possible to easily realize the flexibility required for the second wiring member.

According to the vehicle circuit body of the configuration of (3) described above, one or more embodiments of the invention can also be applied to a wiring member in which a trunk line including a power supply line having a predetermined current capacity and a ground line is formed in the shape of a spine (backbone).

According to the vehicle circuit body of the configuration of (4) described above, a flexible portion is provided in a part of the wiring member in the longitudinal direction, so that folding can be performed in the part. Therefore, it is possible to efficiently carry, pack, or transport the vehicle circuit body.

According to the vehicle circuit body of one or more embodiments of the invention, wiring can be performed along the concavo-convex shape of the body panel. In addition, it is possible to realize the reduction in the size of the vehicle circuit body.

Hereinbefore, one or more embodiments of the invention are briefly described. In addition, the details of embodiments of the invention will be further clarified by reading the embodiments described below with reference to the accompanying drawings.

BRIEF DESCRIPTION OF DRAWINGS

FIGS. 4A and 4B are perspective views of a main part which illustrate a state where the vehicle circuit body of the embodiment according to the invention is wired on the body panel and in which an insulating coating is removed and an inside of the vehicle circuit body is partially exposed.

DETAILED DESCRIPTION

The applicant has filed a patent application on Sep. 26, 2016 (Japanese Patent Application No. 2016-187627). A vehicle circuit body of the embodiment according to the invention can be applied to the vehicle circuit body described in Japanese Patent Application No. 2016-187627. For better understanding of the vehicle circuit body of the embodiment according to the invention, the outline of the vehicle circuit body described in Japanese Patent Application No. 2016-187627 will be described prior to specifically describing the vehicle circuit body.

<Outline of Vehicle Circuit Body Described in Japanese Patent Application No. 2016-187627>

(Vehicle Circuit Body)

First, a basic configuration of the vehicle circuit body will be described.

Figure 1:
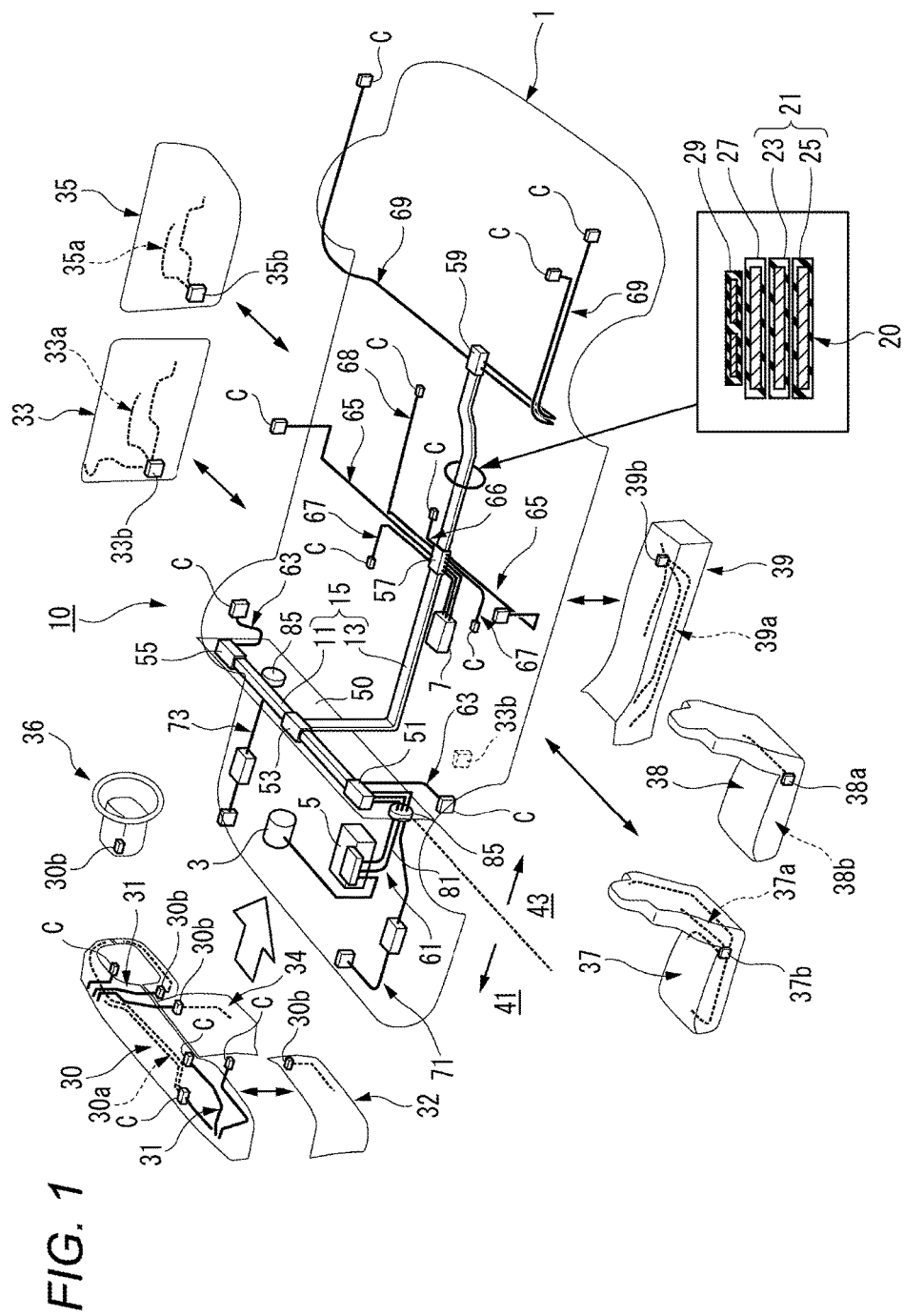
FIG. 1 is an exploded perspective view illustrating a layout and a connection state of each part in a state where a vehicle circuit body of an embodiment according to the invention is wired on a body panel and an outline of each module mounted on the body panel.

An outline of the layout and connection state of each part in a state where a vehicle circuit body 10 is wired on a body panel is illustrated in FIG. 1.

The vehicle circuit body is used for supplying electric power from a main power source such as an in-vehicle battery or the like to auxiliary machines (electrical components) of each part of a body panel or as a necessary transmission route for exchanging signals between electric components (see FIG. 1). That is, although it is functionally similar to a general wire harness mounted on a vehicle, it is significantly different from a general wire harness in shape and structure.

Specifically, for simplifying the structure, a trunk line including a power supply line having a predetermined current capacity, a communication line having a predetermined communication capacity, and a ground line is constituted by a wiring member 20 having a simple shape such as a spine (backbone). The "predetermined current capacity" is a necessary and sufficient current capacity, for example, when all electrical components that can be mounted on a mounting target vehicle are mounted and used and the "predetermined communication capacity" is a necessary and sufficient communication capacity, for example, when all electrical components that can be mounted on the mounting target vehicle are mounted and used. Further, various auxiliary machines (electric components) can be connected via branch lines connected to plural control boxes distributed and arranged along the trunk line.

Figure 2:
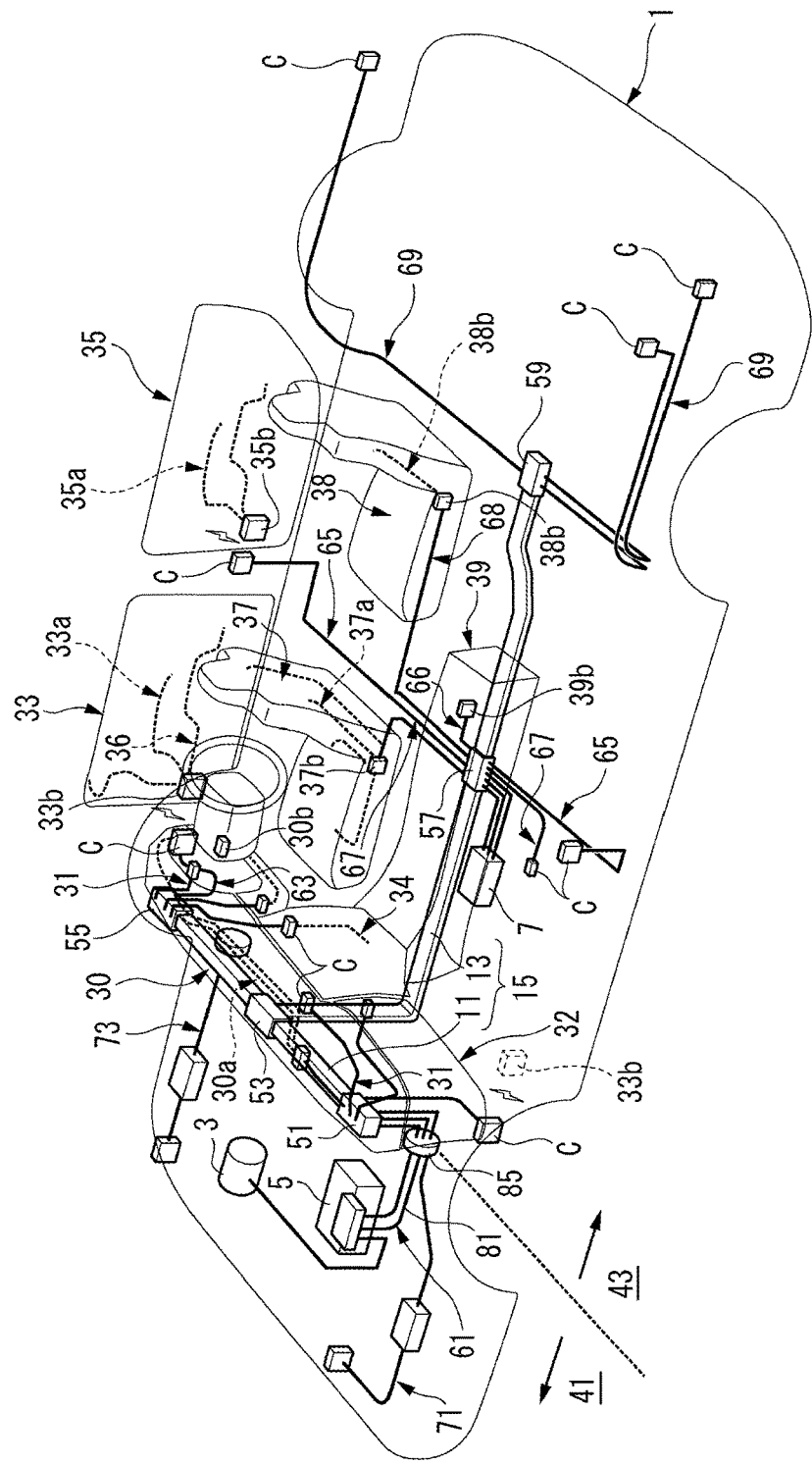
FIG. 2 is a perspective view illustrating a state where each module illustrated in FIG. 1 is mounted on the body panel.

The vehicle circuit body 10 illustrated in FIGS. 1 and 2 includes, as basic components, a trunk line (backbone trunk line portion 15) which includes a power supply line 21 and a communication line 29 and is wired on a body panel 1, branch lines (instrument panel branch line sub-harness 31, front door branch line sub-harness 63, rear door branch line sub-harness 65, center console branch line sub-harness 66, front seat branch line sub-harness 67, rear seat branch line sub-harness 68, and luggage branch line sub-harness 69) which are connected to electric components of respective parts of the body panel, and plural control boxes (supply side control box 51, branch control box 53, intermediate control box 57, and control boxes 55 and 59) which include control units for distributing the power of the power supply line 21 and the signal of the communication line 29 supplied to the trunk line to the branch lines connected to the trunk line and arranged to be distributed along the trunk line.

Furthermore, the backbone trunk line portion 15 of the vehicle circuit body 10 is roughly divided into an instrument panel backbone trunk line portion 11 and a floor backbone trunk line portion 13.

The instrument panel backbone trunk line portion 11 is disposed linearly in a right-left direction at a position along a surface of a dash panel 50 so as to be substantially parallel to a lean hose (not illustrated) at a position above the lean hose. The instrument panel backbone trunk line portion 11 may be fixed to the lean hose.

In addition, the floor backbone trunk line portion 13 is disposed along a floor in the cabin so as to extend in a front-rear direction of the body panel 1 substantially in a center portion of the body panel 1 in the right-left direction. The floor backbone trunk line portion 13 linearly extends in a vertical direction at a portion along the surface of the dash panel 50 and a tip thereof is connected to a middle portion of the instrument panel backbone trunk line portion 11. A connecting portion between the instrument panel backbone trunk line portion 11 and the floor backbone trunk line portion 13 is in a state where those can be electrically connected to each other via a branching portion in the branch control box 53 described below. That is, the backbone trunk line portion 15 is formed in a shape similar to a T shape by the instrument panel backbone trunk line portion 11 and the floor backbone trunk line portion 13.

Further, in the instrument panel backbone trunk line portion 11 described above, an engine compartment sub-harness 61 is connected via the supply side control box 51 arranged on the left side of the body panel 1 which is upstream of the backbone trunk line portion 15. The engine compartment sub-harness 61 includes main power supply cables 81 which electrically connects a main battery 5 which is a main power supply and disposed in an engine room (engine compartment) 41 and an alternator 3.

In this case, there is the dash panel 50 at a boundary between the engine room 41 and a cabin 43 and it is required to completely seal a portion where the electric connection member passes through the dash panel 50. That is, to maintain comfort within the cabin 43, the dash panel 50 is required to have functions of insulation of vibration from the engine room 41, reduction of vibrations and noises from the suspension, and blocking of high heat, noise, odor, and the like, and, to prevent these functions from being impaired, sufficient consideration is also required for a penetrating portion of the electrical connecting member.

As described above, the entirety of the instrument panel backbone trunk line portion 11, the floor backbone trunk line portion 13, the supply side control box 51, the branch control box 53, the intermediate control box 57, and the control boxes 55 and 59 which are main constituent elements of the vehicle circuit body 10 is disposed in a space on the cabin 43 side. The main power supply cable 81 connected to the supply side control box 51 provided on the left end of the instrument panel backbone trunk line portion 11 is wired so as to pass through a grommet 85 fitted in a through hole of the dash panel 50 and is connected to the engine compartment sub-harness 61 in the engine room 41. As a result, the power of the main power supply can be supplied to the supply side control box 51. In addition, for the main power supply cable 81, it is possible to use a material that is easy to bend, to make the cross-sectional shape circular, or to make the cross-sectional area smaller than that of the instrument panel backbone trunk line portion 11, and thus it is possible to easily perform the sealing by the grommet 85 and it is also possible to avoid deterioration in workability when the wiring work is performed.

In addition, when various electric components in the engine room 41 are connected to the instrument panel backbone trunk line portion 11 in the cabin 43, a desired electrical connection path can be realized by, for example, installing a sub-harness 71 connected to the supply side control box 51 so as to penetrate the dash panel 50 or installing a sub-harness 73 connected to the control box 55 so as to penetrate the dash panel 50. In this case, the sub-harnesses 71, 73, and the like have a small cross-sectional area and are easy to bend, and thus it is easy to seal a portion penetrating the dash panel 50.

The instrument panel branch line sub-harness (branch line) 31 and the front door branch line sub-harness (branch line) 63 are connected to the instrument panel backbone trunk line portion 11 via the supply side control box 51 and the control box 55.

The instrument panel branch line sub-harness 31 is electrically connected to module drivers 30b of an instrument panel harness 30a which are electrically connected to control units of electric components such as a meter panel, an air conditioner, and the like mounted on an instrument panel module 30 via a module connector C.

It is preferable that the front door branch line sub-harness 63 be connected to a module driver 33b of the front door harness 33a electrically connected to control units of electric components such as a door lock and a power window mounted on a front door 33 so as to be capable of contactless power feeding and close proximity wireless communication.

Furthermore, the rear door branch line sub-harness (branch line) 65, the center console branch line sub-harness (branch line) 66, the front seat branch line sub-harness (branch line) 67, the rear seat branch line sub-harness (branch line) 68, and sub-battery 7 are connected to the floor backbone trunk line portion 13 via the intermediate control box 57.

It is preferable that the rear door branch line sub-harness 65 be connected to a module driver 35b of a rear door harness 35a electrically connected to control units of electric components such as a door lock and a power window mounted on a rear door 35 so as to be capable of contactless power feeding and close proximity wireless communication.

The center console branch line sub-harness 66 is electrically connected to a module driver 39b of a center console harness 39a electrically connected to control units of electric components such as operation panels of an air conditioner and an audio mounted on a center console 39 via a module connector C.

The front seat branch line sub-harness 67 is electrically connected to a module driver 37b of a front seat harness 37a electrically connected to control units of electric components such as an electric reclining device and a seat heater mounted on a front seat 37 via a module connector C.

The rear seat branch line sub-harness 68 is electrically connected to a module driver 38b of a rear seat harness 38a electrically connected to control units of electric components such as an electric reclining device and a seat heater mounted on a rear seat 38 via a module connector C.

Further, the luggage branch line sub-harness (branch line) 69 is connected to the floor backbone trunk line portion 13 via the control box 59 disposed on the rear side of the body panel 1 which is downstream of the trunk line.

The luggage branch line sub-harness 69 is electrically connected to a module driver (not illustrated) of a luggage harness electrically connected to control units of various electric components in a luggage room via a module connector C.

The module connector C described above can connect the power of the power supply and the ground signal to the control box collectively so that the power and the signal can be efficiently sent to the backbone trunk line portion 15 and each auxiliary machine.

(Wiring Member)

The backbone trunk line portion 15 of the vehicle circuit body 10 includes the power supply line 21, the communication line 29, and a ground line 27 and each line is constituted by a wiring member 20 including a flat conductor.

Further, in the configuration illustrated in FIG. 1, it is assumed that the sub-battery (sub power supply) 7 exists, and thus the backbone trunk line portion 15 of the vehicle circuit body 10 includes a main power supply system (power supply line) 23 and a sub-power supply system (power supply line) 25 as a power supply line 21.

For the power supply line 21, ground line 27 and communication line 29 in the backbone trunk line portion 15, the wiring member 20 adopts flat conductors made of a band-shaped metal material (for example, copper alloy or aluminum) having a flat cross section and these flat conductors of which surroundings are covered with an insulating coating are laminated in the thickness direction (see FIG. 1). That is, the main power supply system 23 is laminated on the sub-power supply system 25 constituting the power supply line 21 and the communication line 29 in which, for example, a pair of flat conductors are aligned is laminated on the ground line 27 which is laminated on the main power supply system 23.

This allows the wiring member 20 to allow passage of a large current and to make it easier to bend in the thickness direction. Further, in the wiring member 20, the power supply line 21 and the ground line 27 are wired in a state where those extend side by side next to each other and it is possible to prevent power supply noise from entering by laminating the ground line 27 between the communication line 29 and the power supply line 21.

Also, the power supply line 21 of the backbone trunk line portion 15 requires a large cross-sectional area to secure a predetermined current capacity. However, the power supply line 21 is constituted by the wiring member 20 including a strip-shaped flat conductor having a flattened cross-sectional shape and it is easy to bend in the thickness direction, and thus it is easy to perform a work for wiring the line along a predetermined wiring path.

(Control Box)

The vehicle circuit body 10 includes five control boxes constituted of the supply side control box 51 disposed on the upstream end (left end of the instrument panel backbone trunk line portion 11) of the backbone trunk line portion 15, the branch control box 53 disposed in a branch portion (a connecting portion between the instrument panel backbone trunk line portion 11 and the floor backbone trunk line portion 13) in the middle of the backbone trunk line portion 15, the intermediate control box 57 disposed in the middle (a middle portion of the floor backbone trunk line portion 13) of the backbone trunk line portion 15, and control boxes 55 and 59 disposed in a downstream end (the right end of the instrument panel backbone trunk line portion 11 and the rear end of the floor backbone trunk line portion 13) of the backbone trunk line portion 15.

(Module)

In the vehicle circuit body 10, the instrument panel branch line sub-harness 31, the front door branch line sub-harness 63, the rear door branch line sub-harness 65, the center console branch line sub-harness 66, the front seat branch line sub-harness 67, the rear seat branch line sub-harness 68, and the like which are connected to the backbone trunk line portion 15 as a branch line are configured as a module integrated with the instrument panel module 30, the front door 33, the rear door 35, the center console 39, the front seat 37, the rear seat 38, and the like.

That is, the instrument panel branch line sub-harness 31 is connected to the module driver 30b of the instrument panel harness 30a electrically connected to control units of electric components mounted in the instrument panel module 30, so that the instrument panel branch line sub-harness 31 can be configured as a module integrated with the instrument panel module 30.

In addition, the front door branch line sub-harness 63 is connected to the module driver 33b of the front door harness 33a electrically connected to the control units of the electric components mounted on the front door 33 so as to be capable of contactless power feeding and close proximity wireless communication, so that the front door branch line sub-harness 63 can be configured as a module integrated with the front door 33.

The rear door branch line sub-harness 65 is connected to the module driver 35b of the rear door harness 35a electrically connected to the control units of the electric components mounted on the rear door 35 so as to be capable of contactless power feeding and close proximity wireless communication, so that the rear door branch line sub-harness 65 can be configured as a module integrated with the rear door 35.

Further, the center console branch line sub-harness 66 is connected to the module driver 39b of the center console harness 39a electrically connected to the control units of the electric components mounted on the center console 39, so that the center console branch line sub-harness 66 can be configured as a module integrated with the instrument panel module 30.

The front seat branch line sub-harness 67 is connected to the module driver 37b of the front seat harness 37a electrically connected to the control units of the electric components mounted on the front seat 37, so that the front seat branch line sub-harness 67 can be configured as a module integrated with the front seat 37.

Further, the rear seat branch line sub-harness 68 is connected to the module driver 38b of the rear seat harness 38a electrically connected to the control units of the electric components mounted on the rear seat 38, so that the rear seat branch line sub-harness 68 can be configured as a module integrated with the rear seat 38.

As illustrated in FIG. 1, the instrument panel module 30 is constituted of plural instrument panel sub-modules such as a glove box 32, a center cluster 34, steering 36, and the like together with an instrument panel body.

A supply side control box 51 arranged on the left side of the instrument panel backbone trunk line portion 11 is located on the left side of the body panel 1 of the instrument panel module 30 to which the glove box 32 is attached.

Therefore, when a mechanical relay for power distribution and a mechanical fuse are provided in the supply side control box 51 electrically connected to the main battery 5 via the main power supply cable 81, it is possible to easily access the mechanical relay and the mechanical fuse in the supply side control box 51 by removing the glove box 32, and thus maintenance for exchanging the mechanical relay and the mechanical fuse becomes easy.

(Effect of Vehicle Circuit Body)

As described above, according to the vehicle circuit body 10, a vehicle circuit body with a simple structure can be constructed by the backbone trunk line portion 15 wired on the body panel 1 with a predetermined current capacity and a predetermined communication capacity and branch lines (the instrument panel branch line sub-harness 31, the front door branch line sub-harness 63, the rear door branch line sub-harness 65, the center console branch line sub-harness 66, the front seat branch line sub-harness 67, the rear seat branch line sub-harness 68, the luggage branch line sub-harness 69, and the like) connecting the electric components of respective parts of the body panel to the backbone trunk line portion 15 via five control boxes (the supply side control box 51, the branch control box 53, the intermediate control box 57, and control boxes 55 and 59) arranged to be distributed along the backbone trunk line portion 15.

That is, the backbone trunk line portion 15 which has a simplified overall shape and constituted of an instrument panel backbone trunk line portion 11 extending in the right-left direction of the body panel 1 and the floor backbone trunk line portion 13 extending in the front-rear direction of the body panel 1 at approximately the center of the body panel 1 is easy to manufacture. The backbone trunk line portion 15 may have a divided structure which can be divided between the respective control boxes and may be connected to each other via the control boxes.

The outline of the vehicle circuit body described in Japanese Patent Application No. 2016-187627 is described above. A structure which can be wired along a concavo-convex shape of the body panel is applied to such a vehicle circuit body. Hereinafter, the vehicle circuit body of the embodiment according to the invention will be described in detail.

<Vehicle Circuit Body According to Embodiment of Invention>

Figure 3:
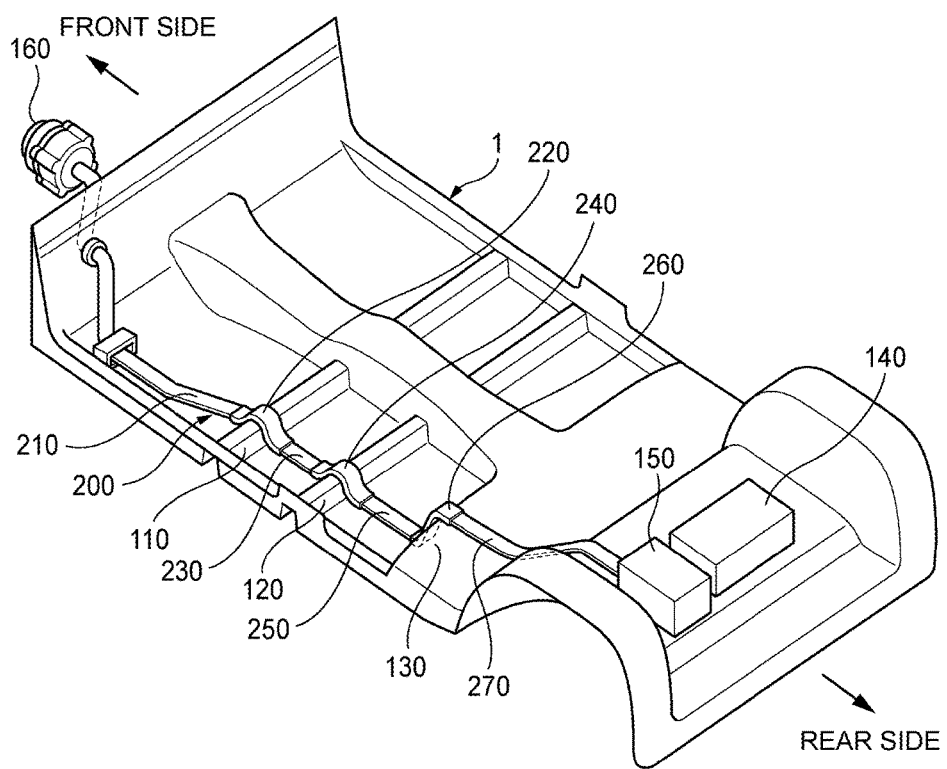
FIG. 3 is a perspective view illustrating a wiring example of the vehicle circuit body of the embodiment according to the invention on the body panel.

FIG. 3 is a perspective view illustrating a wiring example of the vehicle circuit body of the embodiment according to the invention on the body panel. When a vehicle circuit body 200 is used as a battery cable, the vehicle circuit body 200 is wired along the body panel 1 across a front cross member 110 on a front (Fr) side of the vehicle, a rear cross member 120 on a rear (Rr) side, and rear floor 130 further on a rear (Rr) side than the rear cross member 120. As a result, in a rear battery vehicle, a front alternator 160 and the like can be connected to a fuse box 150 connected to a rear battery 140 by the vehicle circuit body 200.

In the present embodiment, the battery cable connecting the fuse box 150 and the alternator 160 is constituted of a single vehicle circuit body 200. However, it goes without saying that the cable can be constituted of a vehicle circuit body which is divided into plural parts in a longitudinal direction. The divided vehicle circuit bodies are electrically connected via a branch box, a connector, and the like.

Figure 5:
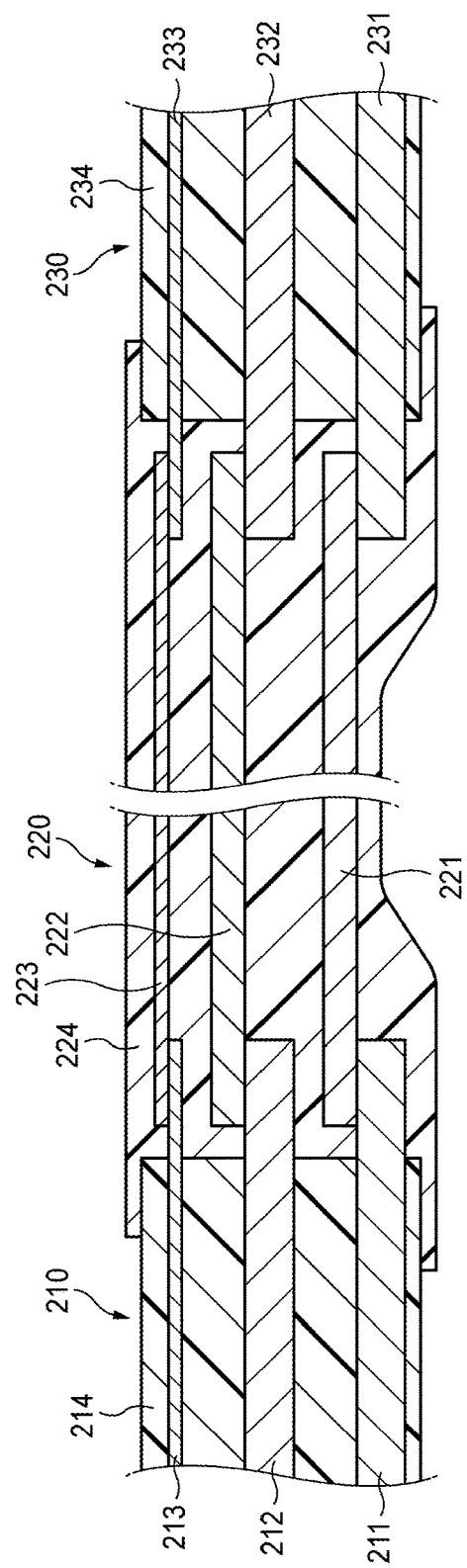
FIG. 5 is a longitudinal cross-sectional view of a main part of the vehicle circuit body of the embodiment according to the invention.

As illustrated in FIG. 3, the vehicle circuit body 200 is wired along the front cross member 110, the rear cross member 120, and the rear floor 130 which are formed so as to protrude from a horizontal surface of the body panel 1 toward the cabin side. Specifically, the vehicle circuit body 200 has a shape bent along the protrusion shape at each of three places, the front cross member 110, the rear cross member 120, and the rear floor 130. Hereinafter, the structure of the vehicle circuit body 200 will be described in detail. FIGS. 4A and 4B are perspective views of a main part which illustrate a state where the vehicle circuit body of the embodiment according to the invention is wired on the body panel and in which the insulating coating is removed and the inside of the vehicle circuit body is partially exposed. FIG. 5 is a longitudinal cross-sectional view of a main part of the vehicle circuit body of the embodiment according to the invention.

In the vehicle circuit body 200, as illustrated in FIG. 3, a first wiring member 210, a second wiring member 220, a third wiring member 230, a fourth wiring member 240, a fifth wiring member 250, a sixth wiring member 260, and a seventh wiring member 270 are connected in order. Specifically, one end of the first wiring member 210 is connected to the alternator 160 and the other end of the first wiring member 210 is connected to one end of the second wiring member 220. The other end of the second wiring member 220 is connected to one end of the third wiring member 230 and the other end of the third wiring member 230 is connected to one end of the fourth wiring member 240. The other end of the fourth wiring member 240 is connected to one end of the fifth wiring member 250 and the other end of the fifth wiring member 250 is connected to one end of the sixth wiring member 260. The other end of the sixth wiring member 260 is connected to one end of the seventh wiring member 270 and the other end of the seventh wiring member 270 is connected to the fuse box 150.

The first wiring member 210, the third wiring member 230, the fifth wiring member 250, and the seventh wiring member 270 are located at the flat portions (that is, the concave portion of the body panel 1 or the rear floor 130) of the body panel 1. On the other hand, the second wiring member 220, the fourth wiring member 240, and the sixth wiring member 260 are located along the protruding portions (that is, the front cross member 110, the rear cross member 120, or the portion from the concave portion of the body panel 1 to the rear floor 130) of the body panel 1.

As described in 'Outline of Vehicle Circuit Body described in Japanese Patent Application No. 2016-187627', the power supply lines, the ground lines, and the communication lines of the first wiring member 210, the third wiring member 230, the fifth wiring member 250, and the seventh wiring member 270 are respectively formed of band-shaped flat conductors. Such a flat conductor is formed by perform extrusion-molding on a copper material or an aluminum material. The entirety of the first wiring member 210, the third wiring member 230, the fifth wiring member 250, and the seventh wiring member 270 have a band plate shape and have low flexibility. When the first wiring member 210, the third wiring member 230, the fifth wiring member 250, and the seventh wiring member 270 are wired, those wiring members are wired on the flat portions of the body panel 1.

In the second wiring member 220, the fourth wiring member 240, and the sixth wiring member 260, each of the power supply line, the ground line, and the communication line is constituted of a conductor with high flexibility. The power supply line and the ground line are formed of flat braided conductors (braids formed into a band plate shape) which are flat-braided in a band plate shape by copper wire or aluminum wire. Therefore, the entirety of the second wiring member 220, the fourth wiring member 240, and the sixth wiring member 260 are formed in a band plate shape and are considered to have high flexibility. As a result, as illustrated in FIG. 4A, the second wiring member 220 and the fourth wiring member 240 are deformed (bent) along a shape of a mountain along the outer surface of the front cross member 110 or the rear cross member 120 of which the cross section protrudes in a trapezoidal shape and wired to the body panel 1. Furthermore, as illustrated in FIG. 4B, the sixth wiring member 260 is wired on the body panel 1 in a state where one end portion close to the concave portion of the inclined surface and the other end portion close to the rear floor 130 of the inclined surface are deformed (bent) so as to extend along the inclined surface from the concave portion of the body panel 1 to the rear floor 130.

Next, the structure for connecting the adjacent wiring members will be described. Here, a structure for connecting the first wiring member 210, the second wiring member 220, and the third wiring member 230 will be described. However, the structure is also applied from the fourth wiring member 240 to the seventh wiring member 270. As illustrated in FIG. 5, the first wiring member 210 includes a power supply line 211, a ground line 212, and a communication line 213 as flat conductors and is formed by laminating those flat conductors of which surroundings are covered with an insulating coating 214 in the thickness direction. The second wiring member 220 includes a power supply line 221, a ground line 222, and a communication line 223 as flat conductors and is formed by laminating those flat conductors of which surroundings are covered with an insulating coating 224 in the thickness direction. The third wiring member 230 includes a power supply line 231, a ground line 232, and a communication line 233 as flat conductors and is formed by laminating those flat conductors of which surroundings are covered with an insulating coating 234 in the thickness direction.

In the other end of the first wiring member 210 located close to the second wiring member 220, the power supply line 211, the ground line 212, and the communication line 213 are exposed from the insulating coating 214. Similarly, in one end of the third wiring member 230 located close to the second wiring member 220, the power supply line 231, the ground line 232, and the communication line 233 are exposed from the insulating coating 234. In the second wiring member 220, one ends of the power supply line 221, the ground line 222, and the communication line 223 are conductively connected to the power supply line 211, the ground line 212, and the communication line 213 of the first wiring member 210 which are exposed and the other ends of the power supply line 221, the ground line 222, and the communication line 223 are conductively connected to the power supply line 231, the ground line 232, and the communication line 233 of the third member 230 which are exposed. A bonding method such as ultrasonic bonding or welding is used for the conductive connection. Alternatively, ground terminals may be provided in the end portions of the power supply line 221 and the ground line 222 so as to be bolted to the power supply lines 211 and 231 and the ground lines 212 and 232. The second wiring member 220 is formed such that the insulating coating 224 covers each layer of the power supply line 221, the ground line 222, and the communication line 223 in a state where the conductive connection of the power supply line 221, the ground line 222, and the communication line 223 is established as described above. Thus, in the vehicle circuit body 200, a part of the conductor formed along the longitudinal direction is formed of a flat braided conductor which is flat-braided in a band plate shape.

The vehicle circuit body of the embodiment according to the invention has been described above. In the vehicle circuit body 200 of the embodiment according to the invention, the wiring members (the second wiring member 220, the fourth wiring member 240, and the sixth wiring member 260) having a second rigidity which is low rigidity (high flexibility) is provided between wiring members (the first wiring member 210, the third wiring member 230, the fifth wiring member 250, and the seventh wiring member 270) having a first rigidity which is high rigidity (low flexibility). In other words, the first rigidity is higher than the second rigidity. The position where the wiring member having high flexibility is provided in accordance with the position of the convex portion (the front cross member 110, the rear cross member 120, and the rear floor 130) when the vehicle circuit body 200 is wired on the body panel, so that the vehicle circuit body 200 can be wired along the concavo-convex shape of the body panel 1. When the position where the wiring member having high flexibility is provided is adjusted, it is possible to change the position by adjusting the length of the wiring member having low flexibility.

Further, according to the vehicle circuit body of the embodiment of the invention, it is not necessary to bend the wiring member before wiring. Therefore, it is possible to remove the step of bending the wiring member from the manufacturing process of the vehicle circuit body. Thus, in the manufacturing process of the vehicle circuit body, productivity can be increased.

Further, according to the vehicle circuit body of the embodiment of the invention, it is possible to bring the wiring member in a folded state. The vehicle circuit body 200 in a folded state can be downsized as compared with a vehicle circuit body of which the shape is stereoscopically maintained in a state where the wiring member is folded. Therefore, the vehicle circuit body 200 can be carried, packed or transported more efficiently. Specifically, it is easy to bring the vehicle circuit body into a vehicle at the time of wiring. In addition, packaging work of the vehicle circuit body becomes easy and the size of the box body accommodating the vehicle circuit body can be reduced. In addition, miniaturization of the packaged items packaged with the vehicle circuit body directly contributes to the improvement in transport efficiency.

Also, according to the vehicle circuit body of the embodiment of the invention, when the body panel is deformed due to a vehicle collision or the like and an external force acts on the vehicle circuit body 200, the external force is applied to the wiring member having high flexibility, and thus it is possible to prevent disconnection of the vehicle circuit body 200. In a case where the wiring member formed of a rigid body is bent in advance, when an external force acts on the wiring member, the stress concentrates on the bent portion, and thus there is a possibility that damage of wiring member may be caused. However, the vehicle circuit body of the embodiment according to the invention can prevent such a situation.

In addition, according to the vehicle circuit body of the embodiment of the invention, the wiring member having low flexibility vibrates according to the vibration of the body panel 1 and the vibration propagates through the vehicle circuit body 200. However, the wiring member having high flexibility can attenuate the vibration propagating through the vehicle circuit body 200.

In the vehicle circuit body of the embodiment according to the invention, band-plate-shaped conductors are adopted as the power supply line, the ground line, and the communication line from the first wiring member 210 to the seventh wiring member 270 and those band-plate-shaped conductors are laminated in the thickness direction. In addition to this structure, it is also possible to adopt a structure in which rod-shaped power supply lines, ground lines, and communication lines having a circular cross section are arranged in the horizontal direction. In this structure, the first wiring member 210, the third wiring member 230, the fifth wiring member 250, and the seventh wiring member 270 uses high-rigidity (low-flexibility) rod-shaped conductors which is formed in a rod shape by extrusion molding as the power supply lines, the ground lines, and the communication lines. On the other hand, the second wiring member 220, the fourth wiring member 240, and the sixth wiring member 260 uses low-rigidity (high-flexibility) rod-shaped conductors which is formed by processing flat braided conductors into a rod shape as the power supply lines, the ground lines, and the communication lines. Then, the vehicle circuit body is formed by connecting those power supply lines, ground lines and communication lines and covering them with an insulating cover in a state where the lines are arranged on the same plane.

In the vehicle circuit body of the embodiment of the invention, a band-plate-shaped conductor is adopted as the communication line from the first wiring member 210 to the seventh wiring member 270. However, the communication line is not limited thereto. Even in a case where a highly flexible cable such as a flexible flat cable (FFC) is adopted as the communication line, the vehicle circuit body 200 can be wired along the concavo-convex shape of the body panel 1.

Here, the vehicle circuit body according to the embodiments of the invention described above is summarized briefly in the following [1] to [4].

[1] A vehicle circuit body (200) including:
a first wiring member (210) including a first power supply line (211) and a first ground line (212) which have high rigidity; and
a second wiring member (220) including a second power supply line (221) and a second ground line (222) which have low rigidity,
wherein the first wiring member (210) is located at a flat portion (a concave portion of a body panel (1)) of a body panel (1), and the second wiring member (220) is located at a protruding portion (front cross member 110) of the body panel (1) protruding toward a cabin side, and
wherein the second power supply line (221) and the second ground line (222) of the second wiring member (220) have flexibility so as to be deformed along a shape of the protruding portion (front cross member 110).

[2] The vehicle circuit body (200) according to [1] described above,
wherein the second power supply line (221) and the second ground line (222) of the second wiring member (220) are formed of flat braid conductors.

[3] The vehicle circuit body (200) according to [2] described above,
wherein the first power supply line (211) and the first ground line (212) of the first wiring member (210) are formed of flat conductors, and the first power supply line (211) and the first ground line (212) are laminated, and
wherein the second power supply line (221) and the second ground line (222) of the second wiring member (220) are laminated.

[4] A vehicle circuit body (200) including:
a plurality of band-plate-shaped conductors (power supply lines 211 and 221, ground lines 212 and 222, and communication lines 213 and 223) are laminated in a thickness direction,
wherein the conductors are formed of flat braided conductors of which parts in a longitudinal direction are flat-braided in a band-plate shape, and
wherein the parts of the plural conductors are laminated in the thickness direction.

The invention claimed is:

1. A vehicle circuit body comprising:
a first wiring member comprising a first power supply line and a first ground line which have high rigidity; and
a second wiring member comprising a second power supply line and a second ground line which have low rigidity,
wherein the first wiring member is located at a flat portion of a body panel, and the second wiring member is located at a protruding portion of the body panel protruding toward a cabin side, and
wherein the second power supply line and the second ground line of the second wiring member have flexibility so as to be deformed along a shape of the protruding portion.

2. The vehicle circuit body according to claim 1,
wherein the second power supply line and the second ground line of the second wiring member are formed of flat braid conductors.

3. The vehicle circuit body according to claim 2,
wherein the first power supply line and the first ground line of the first wiring member are formed of flat conductors, and the first power supply line and the first ground line are laminated, and
wherein the second power supply line and the second ground line of the second wiring member are laminated.

4. A vehicle circuit body comprising:
a plurality of band-plate-shaped conductors are laminated in a thickness direction,
wherein the conductors are formed of flat braided conductors of which parts in a longitudinal direction are flat-braided in a band-plate shape, and
wherein the parts of the plural conductors are laminated in the thickness direction.

* * * * *